US012568999B2

(12) United States Patent
Dimartino et al.

(10) Patent No.: US 12,568,999 B2
(45) Date of Patent: Mar. 10, 2026

(54) COMESTIBLE PRODUCTS

(71) Applicant: Intercontinental Great Brands LLC, East Hanover, NJ (US)

(72) Inventors: Gianluca Dimartino, East Hanover, NJ (US); Indraneil Mukherjee, East Hanover, NJ (US); Wayne Price, Bournville (GB)

(73) Assignee: Intercontinental Great Brands LLC, East Hanover, NJ (US)

( * ) Notice: Subject to any disclaimer, the term of this patent is extended or adjusted under 35 U.S.C. 154(b) by 1301 days.

(21) Appl. No.: 16/985,168

(22) Filed: Aug. 4, 2020

(65) Prior Publication Data

US 2022/0039446 A1 Feb. 10, 2022

(51) Int. Cl.
*A23L 29/238* (2016.01)
*A21D 2/36* (2006.01)
(Continued)

(52) U.S. Cl.
CPC ............ *A23L 29/238* (2016.08); *A21D 2/364* (2013.01); *A23G 1/0016* (2013.01); *A23G 1/325* (2013.01);
(Continued)

(58) Field of Classification Search
CPC ........ A23L 29/238; A23L 15/35; A23L 33/22; A21D 2/364; A21D 2/36; A23G 1/0016; A23G 1/325; A23G 1/36; A23G 1/40; A23G 1/44; A23G 3/42; A23G 1/48; A23V 2002/00; Y02P 60/87
See application file for complete search history.

(56) References Cited

U.S. PATENT DOCUMENTS 4,206,245 A 6/1980 Drevici
4,331,692 A 5/1982 Drevici
(Continued)

FOREIGN PATENT DOCUMENTS

DE 202019101763 U 4/2019
EP 0068229 1/1983
(Continued)

OTHER PUBLICATIONS

Martinez-Angel et al., "Characterization and Evaluation of Cocoa (*Theobroma cacao* L.) Pod Husk as a Renewable Energy Source", May 2015, Agrociencia, vol. 49, No. 3, P1, Abstract (Year: 2015).*
(Continued)

*Primary Examiner* — Emily M Le
*Assistant Examiner* — Tynesha L Mcclain
(74) *Attorney, Agent, or Firm* — Fitch, Even, Tabin & Flannery LLP

(57) ABSTRACT

The invention provides cocoa pod husk powder having a concentration of insoluble dietary fibre of at least 55 wt. % of the total weight of the cocoa pod husk and/or having a concentration of total fibre of at least 68 wt. % of the total weight of the cocoa pod husk, and wherein the total ash content of the powder is no more than 6.0 wt. %. The invention further provides methods of making cocoa pod husk powders of the invention comprising the steps of: reducing cocoa pod husk in a wet-milling process to a paste; and drying the paste at a temperature of at least 80° C., or at least 85° C.

18 Claims, 12 Drawing Sheets
(7 of 12 Drawing Sheet(s) Filed in Color)

| Run/ Sample# | Author/ Inventor | Reference | Wet Treatment | Drying | Milling & final particle size | Aw | Moisture | Protein | Fat | ash | Total Carbs | Total Sugars | Energy | TDF Total dietary fiber | IDF Insoluble dietary fiber |
|---|---|---|---|---|---|---|---|---|---|---|---|---|---|---|---|
| | | | | | | | % | | | %w/w | | | kcal/g | g/100g | g/100g |
| | | | | | | | AOAC925.09 | AOAC980.43 & AOAC992.15 | AOAC054.02 | AOAC942.05 | by diff. | Total sugar | Atwater calc (Protein, Carbs=4, fat=9, fiber=0) | AOAC2009.01 & AOAC 2011.25 |
| Z3 | MDLZ | | Wash→ steep in ~53C water → wet mill | Freeze-drying | knife mill | | 11.1 | 8.6 | 0.8 | 4.6 | 74.7 | | 0.3 | 76.5 | 67.3 |
| Z11 | MDLZ | | Wash → steep in ~56C water → wet mill | Freeze-drying | knife mill | 0.2 | 6.7 | 7.9 | 0.3 | 4.4 | 80.8 | 5.2 | 0.7 | 72.1 | 60.9 |
| B17 | MDLZ | | Wash → steep in ~56C water → wet mill | Freeze-drying | knife mill <40 mesh | 0.04 | 3.7 | 9.3 | 1.3 | 4.4 | 81.4 | 7.6 | 1.0 | 68.6 | 55.2 |
| B13 | MDLZ | | Wash → steep in ~56C water → wet mill | Freeze-drying | knife mill | 0.1 | 5.3 | 8.1 | 0.2 | 4.3 | 82.2 | | 0.9 | 69.3 | 56.1 |
| B14 | MDLZ | preferred embodiment for chocolate | Wash → steep in ~56C water → wet mill | Vacuum oven @ 85C | Knife mill | 0.1 | 3.8 | 8.3 | 0.3 | 4.4 | 83.2 | | 0.7 | 75.1 | 66.3 |
| B18 | MDLZ | most preferred embodiment for chocolate | Wash → steep in ~60C water → wet mill | Oven (45min rotary oven @190C →14h convection oven @95C) | hammer mill < 325 mesh | 0.2 | 5.1 | 7.8 | 1.1 | 3.1 | 82.9 | 3.8 | 0.6 | 76.9 | 67.1 |
| B19 | MDLZ | preferred embodiment for chocolate | Wash → steep in ~60C water → wet mill | Vacuum oven @ 85C | knife mill <40 mesh | 0.3 | 6.1 | 7.0 | 0.7 | 2.8 | 83.4 | 2.4 | 0.6 | 77.8 | 68.1 |
| B16 | MDLZ | preferred embodiment for chocolate | Wash → steep in ~56C water → wet mill | Vacuum oven @ 85C | knife mill <40 mesh | 0.1 | 1.2 | 9.1 | 1.1 | 4.3 | 84.4 | 4.6 | 0.8 | 75.1 | 65.5 |

(51) Int. Cl.

| | |
|---|---|
| *A23G 1/00* | (2025.01) |
| *A23G 1/32* | (2006.01) |
| *A23G 1/36* | (2006.01) |
| *A23G 1/40* | (2006.01) |
| *A23G 1/44* | (2006.01) |
| *A23G 3/42* | (2006.01) |
| *A23L 15/00* | (2016.01) |

(52) U.S. Cl.
CPC ................. *A23G 1/36* (2013.01); *A23G 1/40* (2013.01); *A23G 1/44* (2013.01); *A23G 3/42* (2013.01); *A23L 15/35* (2016.08); *A23V 2002/00* (2013.01)

(56) References Cited

U.S. PATENT DOCUMENTS

| | | |
|---|---|---|
| 2004/0052910 A1 | 3/2004 | Nakamura |
| 2007/0292577 A1 | 12/2007 | Kopp |
| 2010/0086663 A1 | 4/2010 | Brandstetter |
| 2011/0151098 A1 | 6/2011 | Chronopoulos |
| 2012/0035252 A1 | 2/2012 | Steffan |
| 2013/0302473 A1 | 11/2013 | Bernaert |
| 2019/0230957 A1 | 8/2019 | Jaramillo |
| 2019/0357560 A1 | 11/2019 | Ceballos |

FOREIGN PATENT DOCUMENTS

| | | |
|---|---|---|
| EP | 1219286 A1 | 7/2002 |
| EP | 1733624 | 12/2006 |
| EP | 3613297 A1 | 2/2020 |
| JP | H08298959 | 11/1996 |
| PH | 12017000078 | 10/2018 |
| WO | 2004071210 | 8/2004 |
| WO | 2018147718 | 8/2018 |
| WO | 2020038905 | 2/2020 |
| WO | 2020038906 | 2/2020 |

OTHER PUBLICATIONS

Amir, et al.; "Development and physical analysis of high fiber bread incorporated with cocoa (*Theobroma cacao* sp. ) pod husk powder"; International Food Research Journal 20(3), 2013, pp. 1301-1305.

Martinez, et al.; "Chemical, technological and in vitro antioxidant properties of cocoa (*Theobroma cacao* L.) co-products"; Food Research International 49, (2012), pp. 39-45.

Ozung, et al.; "Chemical Composition of Differently Treated Forms of Cocoa POD Husk Meal (CPHM)"; Asian Journal of Agricultural Science, 8(2), 2016, pp. 5-9.

Pavlovic, et al. "Cocoa Bean Shell—A Promising By-Product Rich In Bioactive Compounds"; Food in Health and Disease, scientific-professional journal of nutrition and dietetics (2019) 8 (2), pp. 116-122.

Vriesmann, et al.; "Extraction and characterization of pectin from cacao pod husks (*Theobroma cacao* L.) with citric acid"; LWT—Food Science and Technology 49 (2012), pp. 108-116.

Yapo, et al. "Adding Value to Cacao Pod Husks as a Potential Antioxidant-Dietary Fiber Source"; American Journal of Food and Nutrition, vol. 1, No. 3, Adding Value to Cacao Pod Husks as a Potential Antioxidant-Dietary Fiber Source, 2013, pp. 38-46.

Adi-Dako, Ofosua, et al.; "Physicochemical and Antimicrobial Properties of Cocoa Pod Husk Pectin Intended as a Versatile Pharmaceutical Excipient and Nutraceutical", Journal of Pharmaceutics, vol. 2016, Jan. 1, 2016, pp. 1-12.

International Search Report and Written Opinion of the International Searching Authority, date of mailing Nov. 12, 2021, International Application No. PCT/US2021/044171 (16 pgs.).

Tsai, Wen-Tien, et al.; "Characterization of acid-leaching cocoa pod husk (CPH) and its resulting activated carbon", Biomass Conversion and Biorefinery, vol. 8, No. 3, Feb. 14, 2018, pp. 521-528.

* cited by examiner

| Run/Sample# | Author/Inventor | Reference | Wet Treatment | Drying | Milling & final particle size | Aw | Moisture % | Protein | Fat | ash %w/w | Total Carbs | Total Sugars | Energy kcal/g | TDF Total dietary fiber g/100g | IDF Insoluble dietary fiber g/100g |
|---|---|---|---|---|---|---|---|---|---|---|---|---|---|---|---|
| | | | | | | | AOAC925.09 | AOAC990.43 & AOAC992.15 | AOAC954.02 | AOAC942.05 | by diff. | Total sugar | Atwater calc (Protein, Carb=4, fat=9, fiber=0) | AOAC2009.01 & AOAC 2011.25 | AOAC2009.01 & AOAC 2011.25 |
| Z3 | MDLZ | | Wash → steep in ~53C water → wet mill | Freeze-drying | knife mill | | 11.1 | 8.6 | 0.8 | 4.6 | 74.7 | | 0.3 | 76.5 | 67.3 |
| Z11 | MDLZ | | Wash → steep in ~56C water → wet mill | Freeze-drying | knife mill | 0.2 | 6.7 | 7.9 | 0.3 | 4.4 | 80.8 | 5.2 | 0.7 | 72.1 | 60.9 |
| B17 | MDLZ | | Wash → steep in ~56C water → wet mill | Freeze-drying | knife mill <40 mesh | 0.04 | 3.7 | 9.3 | 1.3 | 4.4 | 81.4 | 7.6 | 1.0 | 68.6 | 55.2 |
| B13 | MDLZ | | Wash → steep in ~56C water → wet mill | Freeze-drying | knife mill | 0.1 | 5.3 | 8.1 | 0.2 | 4.3 | 82.2 | | 0.9 | 69.3 | 56.1 |
| B14 | MDLZ | preferred embodiment for chocolate | Wash → steep in ~56C water → wet mill | Vacuum oven @ 85C | Knife mill | 0.1 | 3.8 | 8.3 | 0.3 | 4.4 | 83.2 | | 0.7 | 75.1 | 66.3 |
| B18 | MDLZ | most preferred embodiment for chocolate | Wash → steep in ~60C water → wet mill | Oven (45min rotary oven @190C →14h convection oven @95C) | hammer mill < 325 mesh | 0.2 | 5.1 | 7.8 | 1.1 | 3.1 | 82.9 | 3.8 | 0.6 | 76.9 | 67.1 |
| B19 | MDLZ | preferred embodiment for chocolate | Wash → steep in ~60C water → wet mill | Vacuum oven @ 85C | knife mill <40 mesh | 0.3 | 6.1 | 7.0 | 0.7 | 2.8 | 83.4 | 2.4 | 0.6 | 77.8 | 68.1 |
| B16 | MDLZ | preferred embodiment for chocolate | Wash → steep in ~56C water → wet mill | Vacuum oven @ 85C | knife mill <40 mesh | 0.1 | 1.2 | 9.1 | 1.1 | 4.3 | 84.4 | 4.6 | 0.8 | 75.1 | 65.5 |

FIG.1A

| Run/ Sample# | Author/ Inventor | Reference | Wet Treatment | Drying | Milling & final particle size | Aw | Moisture | Protein | Fat | ash | Total Carbs | Total Sugars | Energy | TDF Total dietary fiber | IDF Insoluble dietary fiber |
|---|---|---|---|---|---|---|---|---|---|---|---|---|---|---|---|
| CPHP | Yapo et al. | American Journal of Food and Nutrition, 2013, Vol. 1, No. 3, 38-46 | wash→ minced → soaked in 2% aq. sodium hypochlorite soln | oven dried @ 40-45C to const. wt. | hammer mill → < 12mm sieve | | 8.5 | 8.9 | 2.3 | 7.9 | 72.4 | 13.2 | 1.1 | 59 (AOAC, MES-Tris buffer method) | 47.8 |
| Cocoa Pod Husks | Martinez et al. | Food Research International 49 (2012) 39-45 | 2X wash in 30C water (1:1 w/v) | air tunnel dried @ 60C for 12h | ground: 220-640 μ | | 6.6 | 4.2 | 2.3 | 8.4 | 85.0 (calc.) | | 1.5 | 56 (AOAC991.43) | 53.0 |
| CPHF | Vriesmann et al. | Industrial Crops and Products 34 (2011) 1173-1181 | None | received in dry state | Wiley 934 Mill, < 18 mesh | | 8.5 | 8.6 | 1.5 | 6.7 | 32.3 | 10.4 (reducing sugars) | | 36.6 (per AOAC guidelines) | 27.0 |
| RCPHM | Ozung et al. | Asian J. Agric. Sci., 8(2): 5-9, 2016 | Washed | sun-dried, 14 days | hammer mill | | 5.4 | 9.4 | | 9.3 | | | | 61.8 (Crude fiber) | |
| HCPHM | Ozung et al. | Asian J. Agric. Sci., 8(2): 5-9, 2017 | RCPHM treated with 100C water, 15min | shade-dried | | | 14.7 | 8.9 | | 10.9 | | | | 53.37 (Crude Fiber) | |
| US4206245 | Drevici | USPat# 4206245 | Alkaline-treated whole cocoa fruit→ peeled→ acid neutralized→ opened pod → separated beans | Infrared | | | 8.0 | 5.1 | 0.7 | 9.2 | 77.0 | 1.28 (invert sugar) | 1.7 | 40 (Crude Fiber) | |
| | | Prior art ranges | | | | | 5.4 to 15 | 4.2 to 9.4 | 1.5 to 2.3 | 7.9 to 10.9 | | 10.4 to 13.2 | >1 | 36.6 to 61.8 | 27 to 47.8 |
| 100052-722 | Barry C | Defatted cocoa powder, commercial product | unknown | unknown | < 200 mesh | | < 5 | 25.4 | 1.0 | <14 | 57.9 | 0.6 | 1.3 | 38.0 | 28.8 |
| | | Commercial cocoa pod husk ingredient | unknown | unknown | < 40 micron | | 4.7 | 5.0 | 0.9 | 9.8 | 79.7 | 11.0 | 2.1 | 64.6 | 49.9 |

FIG.1B

| Moisture | Aw |
|---|---|
| 9.9% | 0.578 |
| 9.2% | 0.563 |
| 9.4% | 0.573 |

FIG. 4A

| | Control | CPH 85C Vac Oven Dried | CPH Freeze Dried |
|---|---|---|---|
| Particle size (d90), micron | 25.5 | 60.3 | 64.3 |
| Viscosity @ 60 s-1 | 6.0 | 6.5 | 12.1 |
| Viscosity @ 10 s-1 | 12.5 | 11.2 | 19.4 |
| Viscosity @ 5 s-1 | 19.1 | 15.9 | 26.8 |
| Viscosity @ 2 s-1 | 36.4 | 27.9 | 43.4 |

FIG. 5B

| | 10% CPH-Vac85C | 10% CPH-FD |
|---|---|---|
| Texture and mouthfeel | • Large particle size, grainy<br>• Powdery but not so unpleasant mouthfeel<br>• Some mouth-drying/ coating<br>• Dark chocolate-like mouthfeel<br>• Generally "clean-ish" eat<br>• Less cloying<br>• Bland but physical texture<br>• Cleaner | • More mouth coating and linger<br>• Cloying, stick to mouth<br>• Pasty/ creamy<br>• Less grainy<br>• Less clean bite<br>• Hint of powdery |
| Flavor | • Grassy/ vegetable/ plant matter notes – but goes away quickly<br>• Fairly caramelized | • More grassy/ green/ veg matter notes<br>• More significant off- notes<br>• Less caramel<br>• Musty off-flavor |

FIG. 5D

COMESTIBLE PRODUCTS

TECHNICAL FIELD

This invention relates to cocoa pod husk powders, comestible products and methods for manufacturing the same. In particular, the invention relates to cocoa pod husk powders, comestible products comprising cocoa pod husk and methods for manufacturing cocoa pod husk powder for use in human comestible products.

BACKGROUND

Cocoa pod husk ("CPH"), also known as "cocoa fruit flesh", is the outer body of the cocoa pod or fruit, surrounding the core of cocoa beans and pulp. It is also known by other names such as "cascara", "cocoa pod pericarp", "cocoa pod hull", "cortex" and "shell". Hereinafter the terms "cocoa pod husk" and "cocoa fruit flesh" will be used interchangeably to denote the outer body of the cocoa fruit. Cocoa pod husk accounts for between around 52-76 wt. % of fresh intact cocoa pods or fruits. During cocoa pod processing, for each ton of dry cocoa beans extracted from the pod, around 10 tons of wet cocoa pod husk is generated.

Cocoa pod husk is generally considered a waste product and disposed of through landfill, incineration and the like. There have been attempts to utilise the cocoa pod husk, or at least parts thereof, as a product which can be incorporated into comestible products. For example, in U.S. Pat. No. 4,206,245, the cocoa pod husk (termed cocoa fruit flesh in the patent) is first processed by peeling the outer skin from the husk and then removing the cocoa beans and pulp, leaving the peeled cocoa pod husk. This peeled husk is then processed to either extract a juice containing pectins, or is comminuted to provide a powder which can be used in further products. Examples in U.S. Pat. No. 4,206,245 include using the extracted husk juice in tobacco product manufacture, and the use of the peeled husk powder in various foodstuffs, including beverages, mayonnaise, macaroni, cake mixture, chocolate dessert, pizza base and animal feed.

Other methods of producing cocoa pod husk powder are described in B. Yapo, V. Besson, B. Benoit and L. Kouassi, "Adding Value to Cacao Pod Husks as a Potential Antioxidant-Dietary Fiber Source," American Journal of Food and Nutrition, vol. 1, no. 3, pp. 38-46, 2013, R. Martinez, P. Tones, M. A. Meneses, J. G. Figueroa, J. A. Perez-Alvarez and M. Viuda-Martos, "Chemical, technological and in vitro antioxidant properties of cocoa (*Theobroma cacao* L.) co-products", L. Vriesmann, R. Amboni, C. Petkowicz "Cacao pod husks (*Theobroma cacao* L.): Composition and hot-water-soluble pectins", P. Ozung, O. Oko and E. A. Agiang "Chemical Composition of Differently Treated Forms of Cocoa POD Husk Meal (CPHM)" and I. Amir, H. Hanida and A. Syafiq, "Development and physical analysis of high fiber bread incorporated with cocoa (*Theobroma cacao* sp.) pod husk powder," International Food Research Journal, vol. 20, no. 3, pp. 1301-1305, 2013. These methods produce cocoa pod husk powder with different compositional make-up, and do not maximise the total dietary fibre or insoluble dietary fibre of the resultant products. Of the prior art CPH powders, the highest total amount of fibre in the cocoa pod husk powder, produced using the method described in Ozung et al., is 61.8 wt. % of the powder, while the highest total amount of insoluble dietary fibre is described in Martinez et. al, at 53 wt. %.

Use of cocoa pod husk in food and beverages has been limited, as the chemical makeup of the cocoa pod husk produced by known methods is not conducive for utilising the cocoa pod husk in commercially useful products. In particular, known techniques for producing cocoa pod husk products, such as cocoa pod husk juice or ground powder, result in products which do not have a high level of fibre, especially pectin, which renders them sub-optimal for use as thickening, gelling or low calorie, fibre-rich bulking agents. In addition, high levels of ash and/or sugars reduces the ability of known cocoa pod husk powders as effective flour replacers or thickening agents in a wide variety of foodstuffs, including bakery products and confectionery.

It would therefore be advantageous to provide cocoa pod husk powder and material which can be used in a wide variety of comestible products, and which overcomes one or more deficiencies of the prior art cocoa pod husk products.

It would furthermore be advantageous to provide cocoa pod husk powder that can be utilised as an effective gelling, thickening or bulking agent and which does not need further processing in order to be used effectively in different foodstuffs or beverages. It would also be advantageous to provide a cocoa pod husk powder that does not have significant viscosifying ability, in order to be used effectively in confections such as chocolate, where it can function similarly to cocoa powder.

In would also be advantageous to provide improved cocoa pod husk powder with higher levels of fibre, compared to known cocoa pod husk powders, especially higher levels of insoluble fibre. In addition, it would be advantageous to provide a cocoa pod husk powder with an increased ratio of insoluble to soluble fibre.

It is therefore an aim of embodiments of the invention to overcome or mitigate at least one problem of the prior art.

SUMMARY

According to a first aspect of the invention there is provided cocoa pod husk powder having an amount of insoluble dietary fibre of at least 55 wt. % and/or a total dietary fibre content of at least 68 wt. % of the total weight of the cocoa pod husk, and wherein the total ash content is no more than 6.0 wt. %.

The ash content of the cocoa pod husk powder of the first aspect of the invention may be no more than 5.5 wt. %, 5.4 wt. %, 5.3 wt. %, 5.2 wt. %, 5.1 wt. %, 5.0 wt. %, or no more than 4.5 wt. %. It has been surprisingly found that cocoa pod husk powder of the invention comprising less than 6.0 wt. % ash, especially no more than 5.5 wt. % or no more than 5.0 wt. % ash enables the CPH powders of the invention to be utilised in a much wider range of foodstuffs, acting in various roles including a non-sweetening bulking agent, flour replacer and/or thickener, without significant detriment to taste or texture of the foodstuff.

In some embodiments the insoluble dietary fibre (IDF) concentration is at least 56 wt. % or at least 58 wt. %. In preferred embodiments the amount of insoluble dietary fibre in the cocoa pod husk powder is at least 60 wt. %, at least 65 wt. %, at least 67 wt. %., at least 68 wt. %, or at least 70 wt. %. In some embodiments the total dietary fibre (TDF) is at least 70 wt. %, at least 71 wt. %, at least 72 wt. %, at least 73 wt. %, at least 74 wt. % or at least 75 wt. %. In some embodiments the insoluble dietary fibre content is at least 60 wt. % of the total weight of the cocoa pod husk and the total dietary fibre content is at least 70 wt. %. In other embodiments, the TDF may be at least 72 wt. % and the IDF may be at least 65 wt. % or the TDF may be at least 75 wt. % and the IDF may be at least 67 wt. %.

According to another aspect of the invention there is provided cocoa pod husk powder having an insoluble dietary fibre content of at least 60 wt. % of the total weight of the cocoa pod husk and total dietary fibre content of at least 70 wt. %. In this aspect of the present invention, although total ash content may be relatively high, the very high levels of IDF and TDF enable the product to be used in a wide variety of comestible products, as a flour replacer, thickener and the like. In preferred embodiments the amount of insoluble dietary fibre in the cocoa pod husk powder is at least 60 wt. %, at least 65 wt. %, at least 67 wt. %., least 68 wt. %, or at least 70 wt. %. In some embodiments the total dietary fibre is at least 70 wt. %, at least 71 wt. %, at least 72 wt. %, at least 73 wt. %, at least 74 wt. % or at least 75 wt. %. In other embodiments, the TDF may be at least 72 wt. % and the IDF may be at least 65 wt. % or the TDF may be at least 75 wt. % and the IDF may be at least 67 wt. %.

Throughout the specification "cocoa pod husk" may refer to either the cocoa pod husk skin, the cocoa pod husk flesh, or both; whereas the term "whole cocoa pod husk" means the combined flesh and skin of the cocoa pod husk.

It should also be noted that "cocoa pod husk" means the outer body of the cocoa fruit or pod that surrounds the cocoa beans and pulp within the fruit. The term "cocoa pod husk" should not be confused with "cocoa shell", "cocoa nib shell" or "cocoa nib husk" which in the art refers to the skin or shell of the cocoa beans (nibs) within the pod or fruit. "Comestible product" means a food or beverage product or ingredient. "Ash" may refer to the mineral content of the cocoa pod husk, including potassium, phosphorous, calcium, silicon, magnesium, sodium and iron, and their oxides. Ash may be determined using test method AOAC942.05 (Official Methods of Analysis of AOAC INTERNATIONAL (OMA) Online).

The total dietary fibre and insoluble dietary fibre may be determined by any suitable method, such as AOAC2009.01 & AOAC 2011.25.

It has surprisingly been found that cocoa pod husk powder can be manufactured with enhanced levels of fibre, especially insoluble dietary fibre, compared to prior art products, and surprisingly also with reduced ash content. The higher fibre content, lower ash content and ability to tune the fibre functionality enables the cocoa pod husk of the invention to be used in comestible products for applications which have not been commercially achievable or acceptable before now, such as for thickening, gelling and bulk filling applications in a wide range of products, while not contributing a significant number of calories. The high levels of fibre and lower levels of ash, enable the cocoa pod husk to be used as a replacement ingredient in many foodstuffs without significantly affecting the taste, mouthfeel or texture of the foodstuffs. In prior art cocoa pod husk products, lower levels of fibre have often result in higher levels of carbohydrates which affect the resultant product more significantly in taste, texture and quality and comparatively contribute more calories.

According to another aspect of the invention there is provided cocoa pod husk powder having an ash content of no more than 5.0 wt. %. It has previously not been thought possible to provide extracts and powders of cocoa pod husk without processing the husk in a way in which ash content is raised to unacceptable levels. The inventors have surprisingly found methods of producing cocoa pod husk powder (extract) in which ash content can be lowered to levels previously unattainable in the prior art, leading to products that can be utilised in a wider variety of comestible products.

The following statements apply to all aspects of the invention.

The cocoa pod husk powder may comprise powdered cocoa pod husk skin and/or powdered cocoa pod husk flesh. In some embodiments the cocoa pod husk powder comprises powdered cocoa pod flesh which has had the skin removed, while in other embodiments the cocoa pod husk powder comprises whole cocoa pod husk powder.

The cocoa pod husk powder may comprise protein in an amount of no more than 15 wt. %, 14 wt. %, 13 wt. %, 12 wt. % 11 wt. % or no more than 10 wt. %.

The cocoa pod husk powder may comprise fat in an amount of no more than 5 wt. %, 4 wt. %, 3 wt. %, 2 wt. % or no more than 1.5 wt. %.

In some embodiments the cocoa pod husk powder comprises at least 55 wt. % insoluble dietary fibre, no more than 10 wt. % protein and no more than 2 wt. % fat. An exemplary cocoa pod husk powder comprises at least 65 wt. % insoluble dietary fibre, no more than 8.5 wt. % protein and no more than 1.5 wt. % fat.

The moisture content of the cocoa pod husk powder may be no more than 10 wt. %, no more than 8.5 wt. % or especially no more than 8 wt. %. In some embodiments the moisture content may be less than 8 wt. %. The decreased moisture in the cocoa pod husk powder of the invention, combined with high concentrations of fibre, enables the products of the invention to be used in applications not possible using prior art CPH powders or products. Therefore, in preferred embodiments, the cocoa pod husk powder of the invention comprises at least 55 wt. % insoluble dietary fibre and less than 8 wt. % moisture.

The water activity (Aw) of the cocoa pod husk powder is preferably less than 0.5, 0.4 or less than 0.3.

The sugars content of the cocoa pod husk powder may be no more than 8 wt. % of the powder, preferably no more than 7 wt. %. According to another aspect of the invention there is provided a cocoa pod husk powder comprising no more than 8 wt. % sugars. It has been found that cocoa pod husk powders comprising no more than 8 wt. % and particularly no more than 7 wt. % sugars enable the CPH powder to be utilised in a much wider range of foodstuffs, acting in various roles including a non-sweetening bulking agent, flour replacer and/or thickener. In some embodiments the cocoa pod husk powder comprises no more than 8 or 7 wt. % sugars and does not comprise invert sugar or comprises less than 1 wt. % invert sugar.

The fibre of the cocoa pod husk powder may comprise lignin, cellulose and/or pectin. In preferred embodiments the fibre comprises all three of lignin, cellulose and pectin. The ratio of lignin to cellulose in the powder may be between 2:1 to 1:2, preferably between 1.25:1 to 1:1.25. The ratio of the amount of pectin in the powder to the total amount of lignin and cellulose combined may be between 1:3 and 1:5 or between 1:3 and 1:4.

The ratio of insoluble dietary fibre:soluble dietary fibre may be between 4:1 and 10:1, and is preferably greater than 4:1 or greater than 4.5:1 or greater than 5:1. In some applications of the cocoa pod husk powder of the invention, such as in use as a low calorie bulking agent, then the ratio of insoluble fibre:soluble fibre may be at least 5:1 or at least 6:1.

In some embodiments the cocoa pod husk powder comprises at least 5 wt. % pectin, or at least 7.5 wt. % pectin. It has been surprisingly found that cocoa pod husk powder can be manufactured which includes significant levels of functional pectin, which enables the cocoa pod husk to be used in a wide variety of applications in which pectin is particularly useful.

According to a further aspect of the invention there is provided a comestible or edible product comprising a cocoa pod husk powder of any of the other aspects of the invention.

When mixed with other ingredients in the comestible product, it should be appreciated that the cocoa pod husk powder of the invention may or may not be in powder form in the final product, and so shall be referred to as "cocoa pod husk" in comestible products.

The comestible or edible product may be any suitable food or beverage, which may be selected from the group comprising: a beverage; confectionery; a baked foodstuff an edible filling; and a spread. In other embodiments, the edible product may be a food or beverage ingredient. The food or beverage ingredient, may be, for example, a bulking agent and in some embodiments may be a bulking agent for chocolate or other confectionery products, for example. The food or beverage ingredient may comprise the CPH powder and one or more further ingredients independently selected from the group comprising fiber, protein, dairy powder, fat, emulsifier, hydrocolloid, carbohydrate, mineral, vitamin, thickener, flavor, color and sweetener. The CPH powder may be intimately mixed with the further ingredients in a ratio of 25:75 to 99.5:0.5 CPH powder:further ingredient(s). The CPH powder and further ingredient or ingredients may be intimately mixed via agglomeration, spray-drying, fluid bed drying, extrusion or any other suitable technique.

The beverage may comprise a powdered beverage, which may be selected from a fruit-flavoured powder beverage, cocoa powder, a malt beverage or any combination thereof. The cocoa pod husk in the powdered beverage may comprise a powder. The cocoa pod husk powder and beverage powder may comprise a homogeneous mix. The cocoa pod husk powder may be present in the beverage powder in an amount of no more than 45 wt. %, 40 wt. %, 35 wt. %, 30 wt. %, 20 wt. %, 15 wt. % or no more than 10 wt. % of the total weight of the beverage powder The beverage may comprise a liquid beverage, which may be selected from milk, milkshake, chocolate milk, a smoothie, a malt-based beverage, a chocolate beverage, soup, a yoghurt drink and a coffee-based beverage. The cocoa pod husk may be present in the liquid beverage in an amount of no more than 45 wt. %, 40 wt. %, 35 wt. %, 30 wt. %, 20 wt. %, 15 wt. % or no more than 10 wt. % of the total weight of the beverage powder.

In both beverage powders and liquid beverages, the cocoa pod husk may act as a thickening or gelling agent in the resultant beverage. In other embodiments the cocoa pod husk may act as a reduced calorie bulking or filling agent, or as a spacing agent, in which it may act to separate sugars and hydrocolloid particles to improve ease of dispersion.

The confectionery product may comprise chocolate. The term 'chocolate' in the context of the present invention is not restricted by the various definitions of chocolate provided by government and regulatory bodies. "Chocolate" is simply a product that contains a fat phase and which comprises cocoa products and sweeteners. Other optional components of chocolate include milk components (e.g. milk fat and milk powder).

The fat may be cocoa butter, butterfat, a cocoa butter equivalent (CBE), a cocoa butter substitute (CBS), a vegetable fat that is liquid at standard ambient temperature and pressure (SATP, 25° C. and 100 kPa) or any combination of the above. In a particular embodiment, the chocolate comprises cocoa butter.

CBEs are defined in Directive 2000/36/EC. Suitable CBEs include illipe, Borneo tallow, tengkawang, palm oil, sal, shea, kokum gurgi and mango kernel. CBE's are usually used in combination with cocoa butter. In one embodiment, the chocolate comprises no more than 5 wt. % CBEs.

The chocolate may comprise a cocoa butter substitute (CBS) (sometimes known as a cocoa butter replacer, CBR) in place of some or all of the cocoa butter. Such chocolate materials are sometimes known as compound chocolate. Suitable CBSs include CBS laurics and CBS non-laurics. CBS laurics are short-chain fatty acid glycerides. Their physical properties vary but they all have triglyceride configurations that make them compatible with cocoa butter. Suitable CBSs include those based on palm kernel oil and coconut oil. CBS non-laurics consist of fractions obtained from hydrogenated oils. The oils are selectively hydrogenated with the formation of trans acids, which increases the solid phase of the fat. Suitable sources for CBS non-laurics include soya, cottonseed, peanut, rapeseed and corn (maize) oil.

The chocolate may comprise at least one vegetable fat that is liquid at standard ambient temperature and pressure (SATP, 25° C. and 100 kPa). Suitable vegetable fats include corn oil, cotton seed oil, rapeseed oil, palm oil, safflower oil, and sunflower oil.

The present invention is further applicable to chocolate products in which some or all of the fat is constituted by a partly or wholly non-metabolizable fat, for example Caprenin.

The chocolate may comprise at least one sweetener. The at least one sweetener may be a bulk sweetener or an intense sweetener. Suitable bulk sweeteners include sucrose, invert sugar syrup, caramel, glucose, fructose, polydextrose, high fructose corn syrup, maltodextrin, honey, maple syrup, stevia and sugar alcohols, for example glycerol, maltitol, isomalt, sorbitol, xylitol, lactitol, erythritol, galactitol, polyglycitol, mannitol, or may be selected from raffinose, inulin, FOS, GOS, IMO, XOS, HMO, soluble corn fibres, cyclodextrins, resistant maltodextrins, or other soluble fibres.

The chocolate product may comprise more than one chocolate material. In one embodiment, the chocolate comprises two different chocolate materials or two different chocolate materials with different appearances. For example, the chocolate may comprise both milk chocolate and white chocolate, or may comprise both milk chocolate and dark chocolate in a swirled pattern.

The chocolate product may be a chocolate bar, for instance a solid chocolate bar or a filled chocolate bar or item. The chocolate product may be a moulded chocolate product (i.e. one in which molten chocolate is solidified in a mould).

The cocoa pod husk may be mixed homogenously with the chocolate ingredients in the chocolate product.

The cocoa pod husk may be present in the chocolate in an amount of no more than 30 wt. %, 20 wt. %, 15 wt. % or no more than 12 wt. % of the total weight of the chocolate. In some embodiments the cocoa pod husk is present in an amount of between 2-10 wt. % or between 5-10 wt. % of the total weight of the chocolate. Thus, in some embodiments the ratio of cocoa pod husk to other chocolate ingredients may be between 30:70 and 1:99, for example.

The confectionery product may be a non-chocolate confectionery such as a sugar-food or sugar-replacement or candy product. Candy products suitable for the invention include, for example, chewy candy such as caramel, toffee, fudge, marshmallow and nougat; sweets; jellies; and gums.

The candy product may include at least one sweetener. The at least one sweetener may be a bulk sweetener or an intense sweetener. Suitable bulk sweeteners include sucrose, invert sugar syrup, caramel, glucose, fructose, polydextrose, high fructose corn syrup, maltodextrin, honey, maple syrup, stevia and sugar alcohols, for example glycerol, maltitol, isomalt, sorbitol, xylitol, lactitol, erythritol, galactitol, polyglycitol, mannitol, or may be selected from raffinose, inulin, FOS, GOS, IMO, XOS, HMO, soluble corn fibres, cyclodextrins, resistant maltodextrins, or other soluble fibres In some embodiments the candy product includes at least one gelling or thickening agent, particularly in chewy candy, gums (or gummy candy), jellies (or jelly candy) and marshmallows.

'Chewy candy' as used herein refers in the art to a particular type of chewable candy which contains fat and emulsifier and includes crystalline sugars or sugar-free bulk sweeteners, within a bulk amorphous phase. It may also be aerated by up to 20%.

Jellies and gummies, are a popular confectionery snack, since they combine a desirable chewing sensation with a sweet flavour. Jelly and gummy candies have traditionally been manufactured using sugars or sugar-free bulk sweeteners together with a gelling agent such as gelatin. Suitable gelling agents for use in jelly or gummy candies of the invention include one or more soluble hydrocolloids is selected from gelatin, xanthan gum, pectin, locust bean gum, psyllium, gum Arabic, starch and sodium alginate.

The cocoa pod husk may be used to replace some or all the gelling or thickening agent in the chewy, gummy or jelly candy. In some embodiments at least 5%, 10%, 15%, 20%, 30%, 40%, 50%, 60%, 70%, 80%, 90% or up to 100% of gelling or thickening agents normally present in the candy may be replaced by the cocoa pod husk. Thus, in embodiments of candies which include gelling or thickening agents, the ratio of cocoa pod husk to gelling or thickening agent (or total amount of gelling or thickening agents) may be between 1:9 and 99:1 such as between 1:4 to 50:1 or between 1:1 and 9:1, for example. In particular, the cocoa pod husk may be used to replace pectin in a chewy, jelly or gummy candy.

When the product is a filling, the filling may be a confectionery filling. A number of confectionery fillings will be apparent to the skilled addressee. The filling may be a fat-based filling material or a water-based filling material. Suitable fat-based filling materials include truffle, mousse, and chocolate. Suitable water-based filling materials include caramel, fondant crème, jam, and gels such as Turkish delight. In one embodiment the filling material is a liquid or flowable material at room temperature. For example, the filling material may be a viscous liquid, such as a caramel, a fondant crème or a gel, such as Turkish delight.

The cocoa pod husk may be used to replace some or all the gelling or thickening agent in the filling. In some embodiments at least 10%, 20%, 30%, 40%, 50%, 60%, 70%, 80%, 90% or up to 100% of gelling or thickening agents normally present in the filling may be replaced by the cocoa pod husk. Thus, in embodiments of fillings which include gelling or thickening agents, the ratio of cocoa pod husk to gelling or thickening agent (or total amount of gelling or thickening agents) may be between 1:9 and 99:1 such as between 1:4 to 50:1 or between 1:1 and 9:1, for example. In particular, the cocoa pod husk may be used to replace pectin in a filling.

In embodiments where the comestible product is a baked product, the baked product may be a flour-based product. By "baked product" as well as a food product which has undergone baking, we also include the product before the act of baking, such as when the product comprises a raw or partially cooked dough or batter form. The flour-based food product may comprise a dough-based or batter-based product, such as a cake, biscuit, cookie, or pastry. The dough or batter may comprise wheat, barley, rye, oat, or maize (corn) flour or any other suitable cereal or non-cereal flour.

The cocoa pod husk may comprise a filler in the baked product. The cocoa pod husk may be used to replace at least part of the flour in the baked product. In some embodiments at least 5%, 10%, 15%, 20%, 25% or 33% of the flour normally present in the baked product may be replaced by the cocoa pod husk. Thus, in some embodiments the ratio of cocoa pod husk to flour in the baked product may be between 5:95 and 35:65 or between 10:90 and 25:75.

According to another aspect of the invention there is provided a comestible product comprising whole cocoa pod husk powder. The comestible product may be as defined and described hereinabove for the other aspects of the invention. The whole cocoa husk powder may comprise insoluble dietary fibre in an amount of at least 55 wt. %, 56 wt. %, 57 wt. %, 58 wt. %, 59 wt. % or at least 60 wt. % of the total weight of the whole cocoa husk powder. In preferred embodiments, the amount of insoluble dietary fibre in the cocoa pod husk powder is at least 65 wt. %, 66 wt. %, 67 wt. %, 68 wt. % or at least 69 wt. %.

The cocoa pod husk powder of any of the aspects of the invention may be manufactured by a method comprising the following steps:

a) Reducing cocoa pod husk to pieces;

b) Optionally, incubating the pieces of cocoa pod husk in water at a temperature of between 35-85° C.;

c) Wet-milling the pieces of cocoa pod husk to form a paste;

d) Drying the paste; and e) Forming a powder from the dried paste.

Steps b) and c) may be performed in any order.

Accordingly, another aspect of the invention provides a method of manufacturing cocoa pod husk powder comprising the steps:

a) Reducing cocoa pod husk to pieces;

b) Optionally, incubating the pieces of cocoa pod husk in water at a temperature of between 35-85° C.;

c) Wet-milling the pieces of cocoa pod husk to form a paste;

d) Drying the paste; and e) Forming a powder from the dried paste.

Steps b) and c) may be performed in any order

It has surprisingly been found that utilising the process described hereinabove produces a cocoa pod husk powder with levels of insoluble dietary fibre above 55 or even 60 wt. % of the total weight of the cocoa pod husk powder, which is far in excess of the insoluble dietary fibre levels achieved in the prior art. Furthermore, the total dietary fibre content exceeds 68 or even 70% wt. %, which is also far in excess of the levels in prior art. The processes also produce products with ash content of no more than 6.0 wt. % As discussed hereinabove, cocoa pod husk powder produced by the methods described herein above retain functionality of the pectin compared to prior art products, which allows the cocoa pod husk powder of the invention to be utilised in a wide range of comestible products and for a number of ingredient applications such as a replacement for thickening and gelling agents (in jelly, gummy or chewy candies, fillings or beverages, for example), or as a bulk filler (in confectionery products such as chocolate, and flour-based products such as cookies, biscuits and cakes, for example).

The step of stilling of cocoa pod husk pieces in warm-hot water (rather than utilising whole pods and neutralising them in alkali and acid treatment steps, as known from the prior art) aids in retaining and concentrating insoluble fibre, by reducing the amount of insoluble fibre lost from leaching from the cocoa pod husk whilst allowing less desirable soluble fibres to leach.

Step a) may comprise chopping or cutting whole cocoa pod husk, cocoa pod husk flesh or cocoa pod husk skin, but preferably uses whole cocoa pod husk. The pieces may have a largest dimension of between 0.05 cm and 10 cm, or 0.05 cm and 5 cm, preferably between 0.5 cm and 3 cm and more preferably between 1 cm and 3 cm The cocoa pod husk used in step a) is preferably fresh cocoa pod husk (e.g. obtained just after opening the pod and collecting the beans) which has not been treated previously, or alternatively is cocoa pod husk which has been vacuum sealed and frozen, in which case there may be a step before step a) of thawing the freeze-dried cocoa pod husk.

The cocoa pod husk used in step a) may also be cleaned and washed, preferably with water.

In some embodiments the skin of the cocoa pod husk may be removed before step a), such as by peeling, but in preferred embodiments the skin is left on the cocoa pod husk.

Step b) may comprise incubating the cocoa pod husk pieces in water for at least 30 minutes, 45 minutes, 60 minutes, 90 minutes, 2 hours, 2.5 hours or at least 3 hours. In some embodiments the time period is at least 4 hours, 5 hours or 6 hours.

Step b) may comprise incubating the cocoa pod husk pieces at a temperature of at least 40° C., 45° C., or at least 50° C., and at no more than 80° C., 75° C., 70° C. or no more than 65° C. In some embodiments the temperature of step b) is between 45° C. and 65° C. or between 45° C. and 60° C. or preferably between 50° C. and 60° C. In some embodiments the temperature is around 52-54° C.

Step b) is believed to steep the cocoa pod husk pieces, and extract some of the water-soluble pectins, sugars, soluble fibres, polyphenols and some proteins/peptides, leaving the more desired insoluble fibres such as insoluble pectins, which would otherwise be removed in prior art processes, such as by alkali or acid treatment, for example. Additionally, it is believed to soften up the pieces for size reduction (wet milling) in the following step c).

The amount of water used in step b) may be between 1 L and 5 L per kg of cocoa pod husk pieces, preferably between 2 L and 4 L, such as around 2.5-3.5 L per kg of cocoa pod husk pieces.

The preferred temperatures, times and water volume are believed to result in a good balance between yield of useful cocoa pod husk fibre and reduction of mold, heavy metal, pesticide and pests in and on the cocoa pod husk.

Step b) may comprise the use of one or more preservatives in the water. Suitable preservatives include sorbates, citric acid, anti-oxidants, essential oils, mild alkali or any combination thereof. The use of a preservative in the incubating water ensures that any mold growth on the cocoa pod husk pieces is minimised.

After step b) the incubating liquor can be removed and discarded and the wet cocoa pod husk pieces are collected.

Step c) may comprise wet-milling the pieces in a suitable grinding or milling machine. The cocoa pod pieces may be placed in a grinder or blender, for example, with or without the addition of between 0.25 and 1 L water per kg cocoa pod pieces. Alternatively, the cocoa pod pieces may be mechanically squeezed, for example using a screw-press, in order to reduce the water content of the pieces before grinding or milling. In another approach, cocoa pod pieces may be homogenized by passing them through a shear mill or colloidal mill, or other equipment designed for the size reduction of wet slurries. It should be noted, however, that the cocoa pod pieces are not dried before grinding or milling (or mechanical squeezing).

The paste produced at the end of step c) is then dried during step d). Drying may be performed by any suitable method, including but not limited to: oven-drying, drum-drying, sun-drying, freeze drying, fluid bed drying and vacuum drying. The drying technique can be chosen depending on the scale of operation, desired colour of the final powder product, functionality and water-binding capacity. The drying method chosen has significant impact on the functionality of the final product, especially affecting its ability to build viscosity, which may be desirable in some applications but undesirable in others.

In preferred embodiments drying is performed using freeze drying or oven drying (with or without vacuum), as these drying techniques have been found to give the resultant powder beneficial, but differing properties. During freeze drying the paste loses between 90-95 wt. % water and forms a dry cake having a water activity (Aw) of under 0.3 and in most cases under 0.2 or under 0.15. The lower the Aw (under 0.25, or most preferably under 0.2), the lower the chances of potential mycotoxin growth in the resultant powder.

Freeze drying may be performed for at least 6 hours, 12 hours, 18 hours, 24 hours, 3 days, 4 days, 5 days, 6 days or at least 7 days.

For vacuum drying, the paste may be placed in an 85° C. vacuum oven and evacuated at <−20 mmHg, to produce a dry cake which has lost between 90-95 wt. % water and achieves the same Aw levels as with freeze drying. Alternative drying methods using heat treatment, such as oven drying can also be employed to achieve desired functionality.

Step e) may comprise knife-milling, hammer-milling or other methods of grinding the dried product produced after step d). Step e) may comprise reducing the dried product to an average particle size of between d90>5 micron and d90<70 micron, such as d90<26 micron.

According to another aspect of the invention there is provided a method of making a cocoa pod husk powder, the method comprising the steps of: reducing cocoa pod husk in a wet-milling process to a paste; and drying the paste at a temperature of at least 80° C. to form a powder from the paste.

The drying step may comprise vacuum drying. The drying step may comprise drying the paste at a temperature of at least 85° C.

It has been found that subjecting the paste to a heat treatment step during drying, at a temperature of at least 80° C. and preferably at least 85° C. enables production of cocoa pod husk fibre with increased levels of insoluble and total dietary fibre, and reduced moisture content.

The method may be used to produce cocoa pod husk powder of any of the other aspects of the invention described hereinabove.

According to another aspect of the invention there is provided use of a cocoa pod husk powder of the invention as a gelling, thickening or bulking agent.

According to another aspect of the invention there is provided use of cocoa husk powder as an egg solids replacer in a comestible product.

According to another aspect of the invention there is provided the use of cocoa husk powder of the invention as a flour replacer in dough or batter. The cocoa husk powder may be used to replace between 1 wt. % and 50 wt. % or between 5 wt. % and 33 wt. % of the flour in dough or batter.

According to another aspect of the invention there is provided a cocoa pod husk powder comprising at least 68 wt. %. insoluble dietary fibre. In some embodiments the amount of insoluble dietary fibre is at least 70 wt. % of the total weight of the cocoa pod husk powder. The cocoa pod husk powder, insoluble dietary fibre and method of manufacturing the powder may be as described and defined hereinabove for the other aspects of the invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In order that the invention may be more clearly understood embodiments will now be described, by way of example only, with reference to the accompanying drawings, of which:

FIG. 1A is a table setting out fibre and other ingredient concentrations in CPH powder of the invention, as well as various ingredient parameters of CPH powder of the invention (FIG. 1A, runs Z3, Z11, B13-14 and B16-19);

FIG. 1B is a table setting out fibre and other ingredient concentrations, and parameters of CPH products described in U.S. Pat. No. 4,206,425, other prior art CPH products and defatted cocoa powder;

FIG. 4A is a photograph of soft cakes produced using egg (control cake) and CPH-FD as a replacement for 30% and 100% egg solids;

FIG. 5B is a table of particle size and viscosity measurements on the experimental chocolate masses described in Example 4;

FIG. 5D is a summary of comments from informal sensory tasting of experimental chocolate bars described in Example 4;

EXAMPLES

Figure 2:
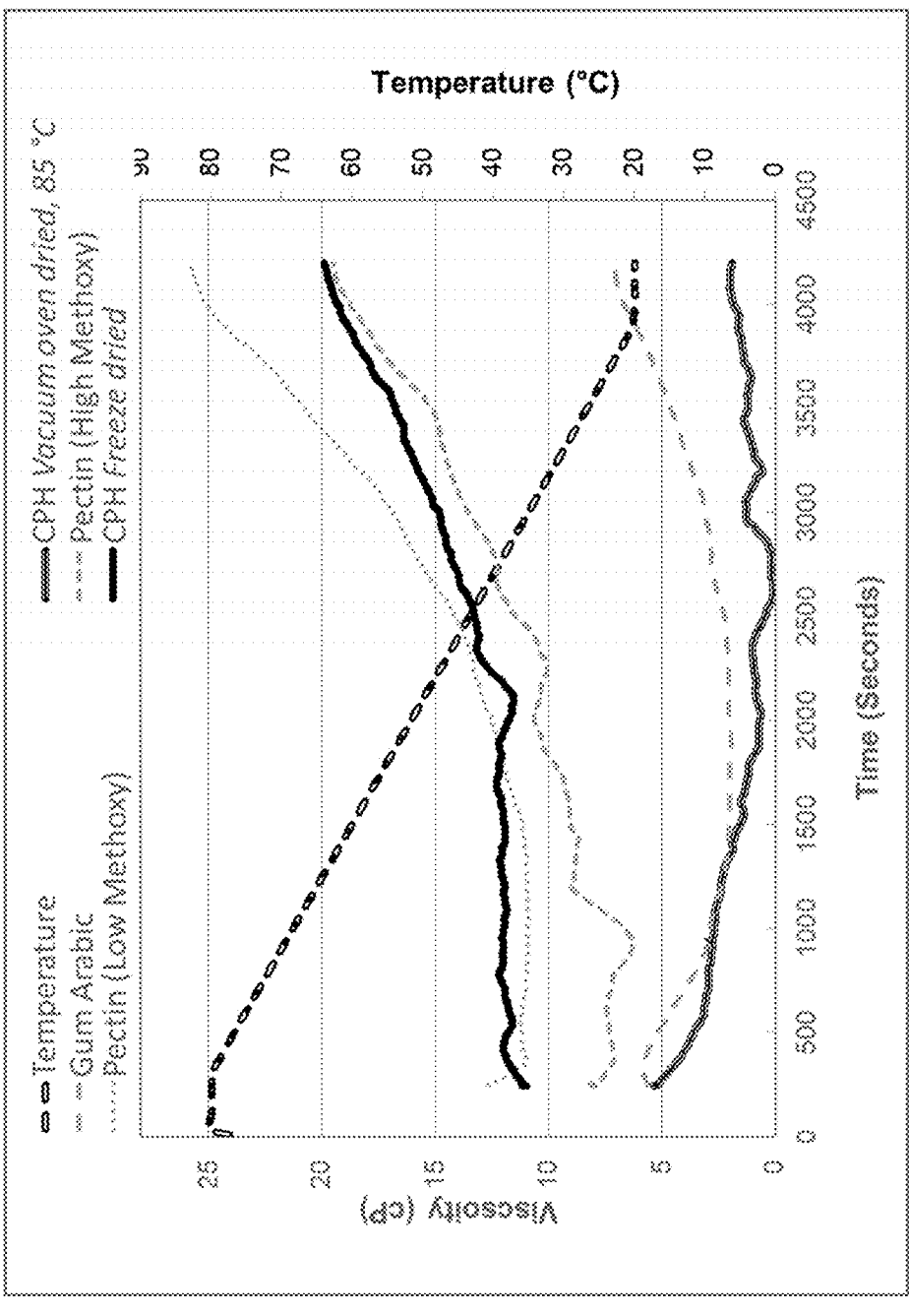
FIG. 2 is a graph illustrating the thickening behaviour of CPH materials with different treatments compared against commercial food hydrocolloids using RVA Method 41.02 (Young NWG, Nonstarch Applications—Hydrocolloids. in: The RVA Handbook (Crosbie GB, Ross AS (eds.)), AACC International, St. Paul, Minn., 2007, p. 85-94), where 1% w/w aq. solution (or suspension) of hydrocolloid is maintained at 80° C. for 5 min, at stirring rate of 160 RPM and then cooled to 20° C. at 1° C./min.

In the Examples described below and as labelled in the Figures, the following abbreviations are used:

CPH—Cocoa Pod Husk

CPH-FD—freeze dried cocoa pod husk made according to the invention

CPH-Vac85C—85° C. vacuum dried cocoa pod husk made according to the invention

FD—freeze dried according to the drying step of the methods of the invention

Vac85C—vacuum dried according to the drying step of the methods of the invention at 85° C.

CPHS—cocoa pod husk skin according to the invention

CPHF—cocoa pod husk flesh according to the invention

CPH(Mix)—cocoa pod husk skin and flesh according to the invention

St—stilled according to the incubation step b) of the methods of the invention

Ml—wet-milled according to step c) of the methods of the invention

StMl and MISt—stilled and wet-milled, or vice versa according to steps b) and c) of the methods of the invention CBS-Whole—whole cocoa pod without treatment according to the invention TDF—Total dietary fibre IDF—Insoluble dietary fibre Comestible product—food or beverage product

Example 1—Preparation of Whole Cocoa Pod Husk Powder, Cocoa Pod Flesh Powder and Cocoa Pod Skin Powder Cocoa pod husk (hereinafter "CPH") was collected immediately after pod opening (the standard process in which beans are removed for chocolate processing and CPH is normally discarded). The fresh CPH was frozen or vacuum-sealed and shipped from cocoa farms for processing. In other embodiments the freezing/vacuum-sealing step can be eliminated by locating processing facilities close to pod opening locations.

The frozen/sealed CPH was then thawed/unsealed and washed with deionised water at room temperature to remove external dirt and debris. After washing, two types of cocoa pod husk were prepared:

a) the outer skin of the CPH was removed with a typical fruit peeler or—other peeling mechanism. This resulted in cocoa pod husk skin, which was only evaluated for contaminants (see FIG. 1) and cocoa pod husk flesh, which was both subsequently used separately in further process steps. Sample #Z3 and Z11 in FIG. 1 are examples of cocoa pod husk flesh only, with the skin removed using a peeler.

b) Some CPH was kept intact, with both skin and flesh intact (i.e. whole cocoa pod husk), and the whole cocoa pod husk used in subsequent process steps (Sample #B16, B17, B18 and B19 of FIG. 1 are all examples where the skin and flesh were both intact).

Next, the CPH of each of the two types was chopped into small chunks of approximately 1 cm in diameter and/or length and incubated in a warm deionised water bath. The bath temperature in some embodiments, may vary from 45 to 85° C. or between 45 and 60° C. The bath temperatures for various samples are reported in FIG. 1. This incubation, or "steeping", step was partly designed to extract out some of the water-soluble pectins, sugars, soluble fibres, some polyphenols, water soluble proteins/peptides, and in general some small molecules that have been formed in the oxidative processes that occurred during cocoa pod husk ripening, whilst retaining significant quantities of insoluble fibre such as lignin, cellulose and insoluble pectins.

Typically, 3.5 L water to 1 kg of useable CPH (or CPH flesh) was used in the incubation step, which was performed for ~3.5 h. A higher amount of water, longer steeping time and agitation during steeping may also potentially be used to further reduce heavy metals and pesticides to desired levels, possibly at the expense of lowering the yield. The use of incubation bath temperatures above 60° C. would be expected to extract out greater quantities of pectin, at the expense of reducing yield, for application in which lower pectin concentrations in the CPH pieces is desired (such as foodstuffs which require less gelling or thickening, for example).

Next, the steeped CPH chunks were collected on a wire or perforated basket (colander) and the steeping/incubation liquor (now dark in colour and more viscous) was discarded. The wet CPH was then placed in food processor, along with ~0.5 L (/kg CPH) deionised water and wet milled in the processor into a fine paste. Optionally, the steeped CPH chunks can be mechanically squeezed (e.g. by screw-press or other de-watering press) to reduce water content, or homogenized by passing through a shear mill.

The paste was then dried using either freeze-drying (Samples #Z3, Z11, B13, B17) or dried in a vacuum oven with temperature set to 85° C. (Samples #B14, B16, B19). In one embodiment (Sample #B18), the paste was first briefly dried in a rotary (reel) oven with temperature set at 190° C. and then further dried in a convection oven set at 95° C.

For freeze-drying (Samples #Z3, Z11, B13, B7), the paste was transferred into a freeze-drying tray and dried from the frozen state for 8 days. During freeze-drying, the paste lost ~93 wt. % water and formed a dry cake, which was then be knife-milled into a dry powder of Aw<0.25. For heated oven drying with or without vacuum (Samples #B14, B16, B19, B18), the paste was transferred to a disposable aluminium foil baking tray, which was placed in the pre-heated oven. For vacuum oven drying (Samples #B14, B16, B19), the vacuum oven was set to a temperature of 85° C. and evacuated to <−20 mmHg for between 4-6 days. For Sample #B18, the paste was first dried in a rotary oven at 190° C. for 45 and then further dried in a convection oven set at 95° C. for 14 h, followed by 65° C. for 7 days. Some embodiments may employ different ovens, such as impingement ovens, infra-red ovens, etc. Alternative industrial drying processes, e.g., fluid bed drying, may be used and in some embodiments the drying time may be reduced to few hours.

In a preferred embodiment for chocolate making (referenced B19 in FIG. 1A), frozen CPH was washed in water for 1 h (thawing) and then cut into chunks using a kitchen knife.

The chunks (9.9 kg) were then steeped for 3 h in deionized water (38 lit) in a jacketed multipurpose mixing vessel (Armfield FT140 CCT550) at 60° C. The deionized water was refreshed once during the steeping process. The steeped chunks were converted into wet paste using a food processor. Next, the paste was dried in a vacuum oven at 85° C., −760 mmHg vacuum for 9 days. The material was then ground in a hammer mill (Bauermeister, USA) and passed through a 40 mesh screen. The resultant powder was then separated into 3 particle size fractions: a) retained on top of 230 mesh screen (i.e., >64 micron) b) through 230 mesh screen (i.e., <64 micron) and c) through 325 mesh screen (i.e., <44 micron). In a most preferred embodiment (B18) that delivers desirable chocolate functionality, the wet paste from the previous embodiment (B19) was first dried in a rotary oven at 190° C. for 45 min and then further dried in a convection oven at 95° C. for 14 h, followed by 65° C. for 7 days. This was followed by grinding in a coffee grinder and passing through a 325 mesh (44 micron) screen.

Various parameters of the products of the invention obtained after the incubation step and wet-milling step are shown in the table of FIG. 1A, while FIG. 1B shows the same parameters with cocoa powder and cocoa pod husk products described in U.S. Pat. No. 4,206,245 and other prior art.

In other embodiments sorbates (E200 and E202) and citric acid (E330), as well as other food-grade preservatives (antioxidants, essential oils, etc.) may be added to the washing and steeping steps in order to minimize possibility of undesirable mould growth.

Results

Contaminant Reduction

The heavy metals level of all of the samples was always below acceptable thresholds.

For cocoa ingredients, the primary heavy metal of normal concern is Cadmium (Cd); however steeping treatment helped bring the Cd level down from 0.4 ppm in a control run R1 (not of the invention), to 0.2 ppm or below in the Runs undertaken according to the invention (and down to less than 0.1 ppm in Run Z3, which was steeped, then wet-milled according to the methods of the invention). In this way, if CPH from field has Cd levels >0.4 ppm, the processes of this invention can be used to bring the level to <0.3 ppm and much lower.

The results also showed that CPH ingredients manufactured using the process of the invention have lower lead and cadmium levels compared to cocoa bean "shell" and "cocoa bran" materials of the prior art. Also, pesticides and mycotoxins levels were well below risk levels acceptable to the global cocoa industry and foods regulations in the majority of countries.

Composition of CPH after Incubation and Wet-Milling

As shown in FIG. 1, for all of the dry powder products of the various CPH starting materials, powdered CPH was obtained by the methods of the invention as a dry powder with up to 12% moisture and an Aw<0.4 (and in most cases no more than 0.2). Yields generally ranged from 11 to 16% of wet weight of useable husk (note that yield of CPH Skin powder is ~3%, because the outer skin is a relatively minor constituent of the husk and hence not subjected to evaluation beyond contaminant determination). The CPH produced at the end of the incubation and milling process are primarily composed of carbohydrates (>70 wt. %), the majority of which is in the form of insoluble fibre, typical levels being over 60 wt. %, with ~15-25 wt. % lignin.

As shown in FIG. 1, ingredients of this invention are identifiable by the following characteristic composition:

Insoluble dietary fibre (IDF) >55 wt. % and preferably:
Total dietary fibre >68 wt. % (generally greater than 70%);
Protein <10 wt. %;
Fat <1.5 wt. %

Another identifiable characteristic of the CPH ingredients of this invention is their low total sugars content which is <8 wt. % (generally <6 wt. %).

A third identifiable characteristic of the CPH ingredients of this invention is their low ash content which is <6 wt. %.

Properties of the CPH after Incubation, Wet-Milling, Drying and Comminuting

As shown in FIG. 2, the thickening behaviour of cocoa pod husk varied significantly with treatment condition and origin of the material. In general, the final viscosity values were comparable to those observed with low and high methoxy pectins, as shown in FIG. 2. Two samples, CPH (Mix) StMl FD (Run B13) and CPH(Mix) StMl Vac85C (Run B14) were particularly interesting. Both samples were steeped and wet-milled together and they were separated only at the point of drying. CPH(Mix) StMl FD was freeze-dried (hence, labelled "FD"), while CPH(Mix) StMl Vac85C was dried in a vacuum oven at 85° C. (hence labelled "Vac85C"). However, final viscosity values, representative of their thickening ability, were completely different. While the freeze-dried material had final viscosity compared to high methoxy pectin, the vacuum oven dried material had even lower viscosity than Gum Arabic. The results suggest that the thickening ability of CPH ingredients can be altered by changing processing conditions, such as drying temperature (heat-treatment).

The table below shows that CPH-FD and CPH-Vac85C had relatively large amounts of total dietary fibre (TDF), 69% and 75% respectively. However, the greater soluble fibre content (SDF) enabled the freeze-dried sample (B13) to build viscosity and function effectively as a gelling/thickening agent. Conversely, the greater insoluble fibre content (IDF) of the vacuum oven dried sample (B14) allowed it to maintain low viscosity, which is preferable in applications such as chocolate confectionary.

| Sample/ Process | Carb | TDF | IDF | SDF | Lignin | Cellu- lose | Uronic acid |
|---|---|---|---|---|---|---|---|
| CPH-FD (B13) | 82.2 | 69.3 | 56.1 | 13.2 | 15.3 | 20.4 | 13.0 |
| CPH-Vac85C (B14) | 83.2 | 75.1 | 66.3 | 8.7 | 23.5 | 24.5 | 14.0 |

Effect of Processing (Freeze or Heat-Treatment) on Composition

Since heat treatment alters the functional behaviour of CPH, effect of such heat treatment on ingredient composition and molecular weight was investigated. CPH dried in vacuum oven (CPH-Vac85C) and freeze-dried CPH (CPH-FD) were compared for full nutrient analysis (proximates analysis), results provided in FIG. 1. The fibre composition was investigated in more detail, comparing the total, insoluble and soluble dietary fibre contents, as well as lignin and uronic acid contents, and the results given in table above.

Compositional analysis indicated slightly lower total dietary fibre (TDF) in CPH-FD. However, a greater portion of the fibre in CPH-FD was water-soluble (SDF was much higher for CPH-FD). Correspondingly, CPH-FD showed lower lignin content than CPH-Vac85C.

Interestingly, both treatments showed about the same uronic acid content, suggesting that the pectin in CPH-FD may have higher methoxy content than CPH-Vac85C. The heat-treatment of CPH-Vac85C is likely to have caused some extent of de-methoxylation.

To study the effect of heat-treatment at the molecular level, 1% aqueous slurries of CPH-Vac85C and CPH-FD were agitated for 24 h. The supernatants (water-extracts) were then passed through a Size Exclusion Chromatography (SEC) column equipped with Refractive Index (RI) detector. For comparison, commercial high and low methoxy pectin powders (containing sucrose as dispersing agent) were used as reference material.

SEC results revealed that the water-extract of CPH-FD had a high molecular weight fraction (~1000 kDa) that was notably larger than even the commercial pectins. This fraction was missing in CPH-Vac-85C and was instead replaced with a very broad peak in the 22 to 800 kDa range.

The presence of this high MW water-soluble fraction may explain the significantly higher viscosity and thickening ability of CPH-FD in comparison to CPH-Vac85C.

Example 2—Cookie Dough Comprising CPH Powder of Example 1

CPH (CPH-StMl that had been incubated, milled and dried according to the method of Example 1) was used to replace 25 wt. % flour in a cookie formula. The cookie formulation (before flour replacement with CPH) comprised 13.54% shortening (palm oil based, SansTrans™ 39 cookie shortening from Loders Croklaan), 27.51% Sugar (granulated, Dominos), 0.44% salt, 0.53% sodium bicarbonate, 0.39% dextrose monohydrate (Staleydex 333 from Tate & Lyle), 9.98% de-ionized water, 47.61% wheat flour (soft wheat blend, refined flour). The water content is tied to the moisture content of the flour, assuming a 14% moisture basis. For other embodiments of cookies, with flours with different moisture content, the water can be adjusted accordingly as per AACCI 10-50 methodology (http://methods.aaccnet.org/methods/10-50.pdf). For the flour replacement experiments 25% of the wheat flour was replaced with CPH, such that the recipe contained 11.9% CPH and 35.71% wheat flour, and the water content in the formulation was adjusted to the moisture content of the dry flour blend comprising CPH and wheat flour. All percentages are by weight (wt. %). Two versions of CPH were used, one in which the CPH drying step was freeze-drying (CPH-FD) and the other in which the CPH drying step was vacuum-drying at 85° C. (CPH-Vac85C), as described above.

The CPH was blended homogeneously with the flour and the flour-CPH mixed with the other cookie dough ingredients in the normal manner.

A control dough was also prepared in which no CPH was used (no flour replacement).

The resultant cookie dough was baked in a rotary oven set at 400° F. (204.4° C.) for 11 min. The oven temperature varied between 381 to 420° F. during the baking.

Results

Figure 3:
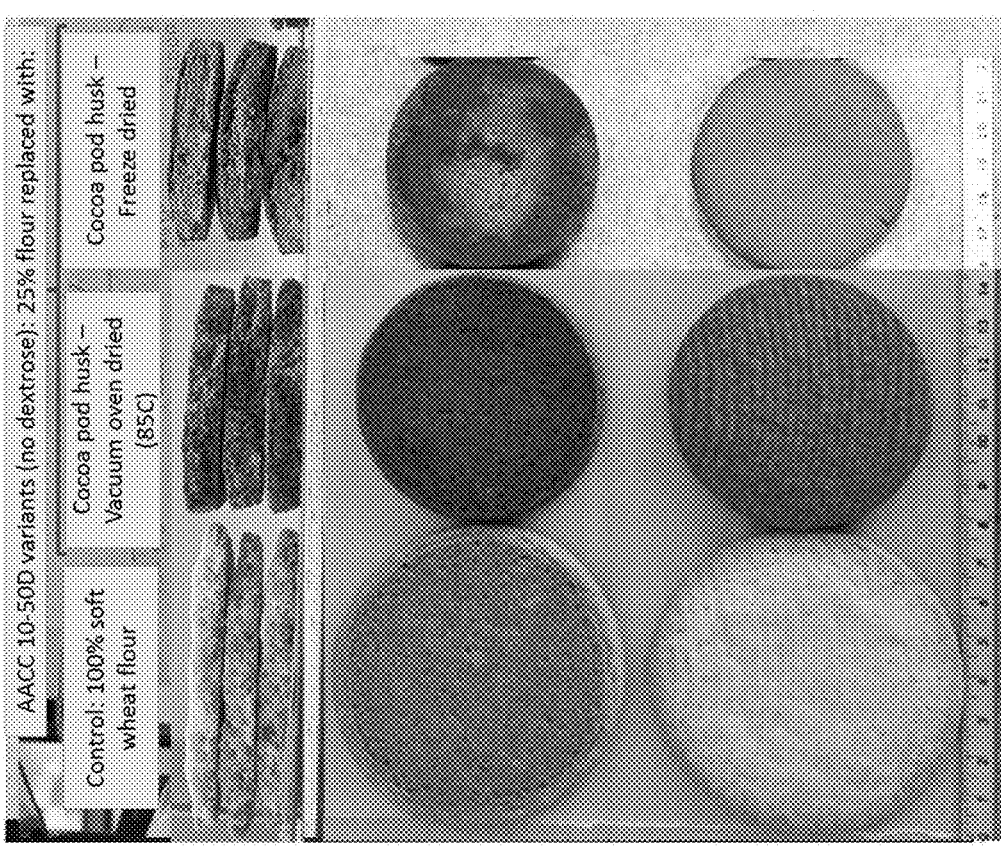
FIG. 3 is a series of photographs showing cookies produced using freeze-dried CPH ("CPH-FD") and 85° C. vacuum-dried CPH ("CPH-Vac85C") of the invention as a 25% replacement of flour, compared to a control cookie.

Photographs of the resultant cookies produced by the method of Example 2 are shown in FIG. 3. It can be seen that the texture of the cookies prepared by using CPH-FD or CPH-Vac85C to replace 25% of the flour in the control cookie, was palatable, while being slightly darker in colour.

There was a significant increase in dough viscosity, increasing LFRA value to ~9 times vs. control for CPH-FD. Also, moisture lost on baking was significantly lower, cookie diameter (spread) was greatly reduced and cookie height (thickness/stack height) significantly increased. All of these behaviours can be attributed to high water-holding functionality of pectin within CPH. Furthermore, CPH containing variants offered a superior "reddish-brown" colour and round table tasting results indicated a much softer texture vs the control cookie. Replacing 25% of flour with vacuum oven dried CPH (CPH-Vac85C) gave a product much closer in behaviour and geometry to control, but with the rich "reddish-brown" color, which has a likeness in appearance to chocolate cookies.

In this way, CPH according to the invention, with significant fibre levels (and especially significant pectin levels) can serve as a functional ingredient in cookie baking and/or can be used as partial flour replacement to drive increased cookie height, reduce spread, soften texture, darken colour, etc.

Example 3—Cake Mix Comprising CPH Powder of Example 1

A comparison of soft cakes that were baked using eggs in the batter, to those prepared with CPH-FD as a partial (30%) or complete (100%) egg replacer, was undertaken.

Specifically, water and fat contributed by the egg was accounted for and replaced (weight for weight) with deionised water and canola oil, while egg "solids" (remaining portion of the egg) were replaced with CPH-FD.

FIG. 4A shows photographs of the soft cake products produced with egg, 30% egg solids replaced with CPH-FD, and 100% of the egg solids replaced with CPH-FD.

Figure 4B:
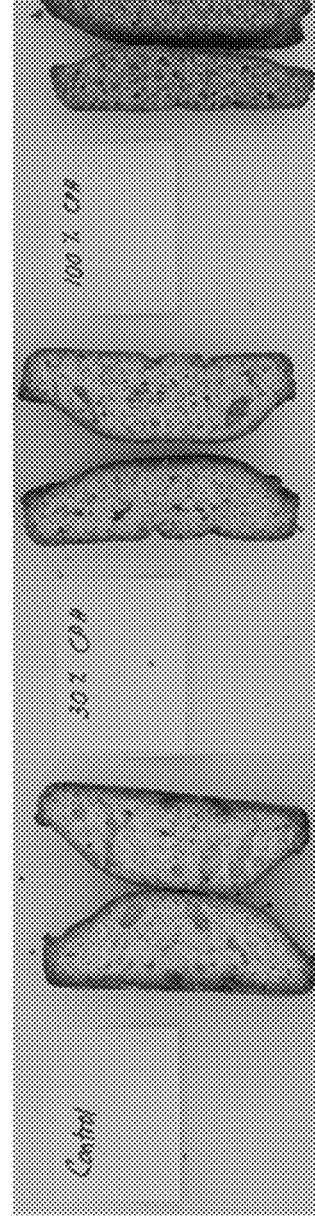
FIG. 4B is a photograph of the slices of the soft cakes shown in FIG. 4A.

FIG. 4B shows photographs of the slices of the three cake products shown in FIG. 4A.

As can be seen from FIGS. 4A and 4B for products prepared with CPH-FD replacement of egg solids, 30% egg replacement with CPH-FD had no notable impact on cake volume, height, density and texture, as shown in FIG. 8A. As can be seen from the photographs the 30% CPH-FD cake products look substantially similar in size and shape to the control products, and the overall dough density and texture can be seen to be similar. These cakes could not be differentiated from control (with 100% egg) in round table taste testing by any of the sensory attributes evaluated., including colour. On the other hand, total (100%) egg replacement with CPH-FD, however, yielded a denser cake, with lower height, firmer texture and much darker colour. None of the formulations were optimized to further match the control cake. Although the 100% egg replacement cake did not match the control, it still yielded a palatable cake product which has different sensory characteristics which may be desired, depending on the characteristics of the cake to be sold.

In this way, CPH, in combination with water and canola oil, can be used to partially replace eggs in soft cake recipes, with no detectable effect on the product. It can also be used to formulate completely eggless cakes, although further work (e.g., including other ingredients in the formulation) would be needed to match the properties of 100% egg cake, if required.

Example 4—Chocolate Comprising CPH Powder of Example 1

An assessment of the impact of using CPH manufactured by the method of Example 1 as an ingredient in a chocolate formulation, was conducted. Both freeze-dried cocoa pod husk (CPH-FD) and 85° C. vacuum oven dried cocoa pod husk (CPH-Vac85C) were incorporated into experimental chocolates at −9.2% (wt.) level. The chocolate was manufactured to the recipes shown in the table below:

| Ingredient | Chocolate recipes | | |
| --- | --- | --- | --- |
| | Control | CPH-FD | CPH-Vac85C |
| | | wt. % | |
| Sucrose | 46.64 | 40.01 | 40.01 |
| CPH-FD | 0.00 | 9.23 | 0.00 |
| CPH-Vac85C | 0.00 | 0.00 | 9.23 |
| Skimmed Milk Powder | 11.88 | 10.19 | 10.19 |
| Whey powder | 8.00 | 7.71 | 7.71 |
| Cocoa mass | 10.19 | 8.74 | 8.74 |
| Cocoa butter | 17.67 | 18.48 | 18.48 |
| Anhydrous Milk Fat | 4.91 | 4.94 | 4.94 |
| Soy lecithin (SN100) | 0.69 | 0.69 | 0.69 |
| Vanillin | 0.01 | 0.01 | 0.01 |

The average particle size of dry CPH ingredients (d90, as measured by dry powder laser diffraction) was as follows: CPH-Vac85C=411 μm; CPH-FD=400 μm The control chocolate mass was made to a particle size (d90) of 26 microns (+/−2 microns) and the process was not altered for the preparation of the chocolate variants containing CPH.

Recipes were modified to allow for reduction in noble ingredients (cocoa solids, milk solids and sugar) but maintaining the same total fat as control (by adjusting cocoa butter and anhydrous milk fat (AMF)). The ratio between cocoa butter and AMF was kept constant.

Figure 5A:
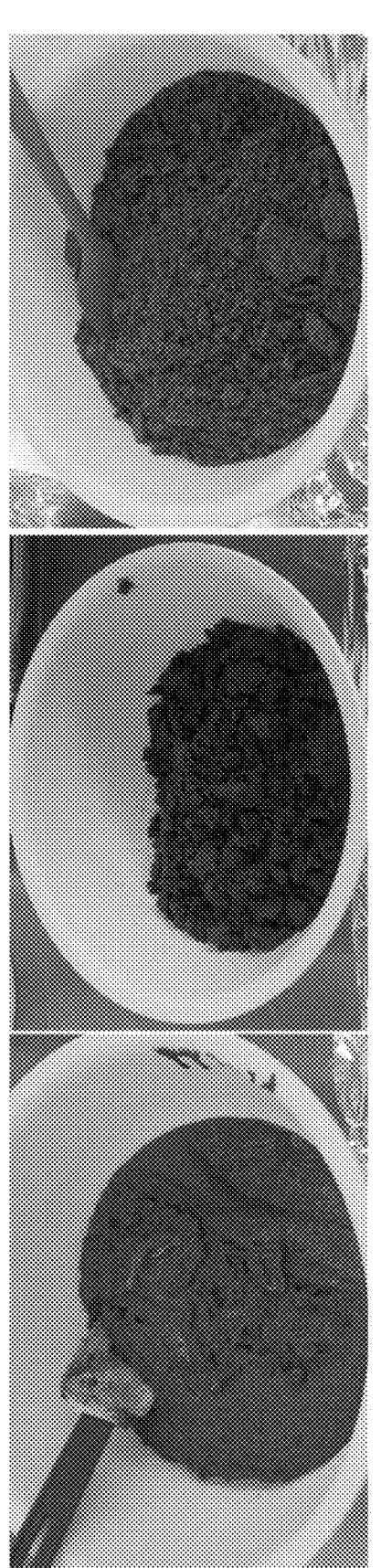
FIG. 5A is a photograph of refiner paste prior to first pass through refiner for the experimental chocolate masses described in Example 4: control (left), CPH-Vac85C (middle) and CPH-FD (right)

Standard chocolate making procedure was followed to make all samples. Each recipe made was made to a total mass of 1.5 kg. A photograph of refiner paste prior to first pass through refiner for the experimental chocolate masses is provided in FIG. 5A. The CPH variants tended to make a "drier" paste on account of greater oil binding ability relative to the sucrose, skimmed milk powder and conventional cocoa mass they were replacing. The particle size and viscosity of the chocolate masses is provided in FIG. 5B. The results suggest that while the freeze-dried CPH increased viscosity of the chocolate mass, the CPH dried in vacuum oven at 85° C. actually had lower viscosity than the control chocolate mass, which may be advantageous during chocolate processing. All recipes were conched in a jacketed Hobart mixer (set to 40° C.).

Finished masses were hand tempered (tempering to 27° C., before bringing up to 29° C. with non-tempered mass) and moulded in standard 40 g bars.

Nutritional composition of the resultant chocolate bars are provided in the table below.

The inclusion of cocoa pod husk in the chocolate bars enabled significant increase in fibre content, as well as reduction of sugars and added sugars.

| Typical Nutritional values/100 g | Control | CPH-FD | CPH-Vac85C |
| --- | --- | --- | --- |
| Energy, kJ | 2205.2 | 2052.4 | 2052.4 |
| Energy, kcal | 526.5 | 490.6 | 490.6 |
| protein | 6.3 | 6.1 | 6.1 |
| carbohydrate | 61.1 | 61.3 | 61.3 |
| Sugars | 58 | 51.5 | 51.5 |
| Added sugars | 46.1 | 40 | 40 |
| fat | 29.1 | 29.3 | 29.3 |
| fibre | 1.7 | 6.1 | 6.1 |

Figure 5C:
FIG. 5C is a photograph of experimental chocolate bars described in Example 4: Control (left); bar with 9.2% CPH-Vac85C (center); bar with 9.2% CPH-FD (right)

Photographs of the experimental chocolate bars containing CPH are provided in FIG. 5C. Informal sensory assessments were conducted to gain initial impressions of the impact of adding the different forms of CPH on the organoleptic properties of the resulting chocolate (FIG. 5D).

Acceptable organoleptic properties were achieved with both CPH-FD and CPH-Vac85C chocolate, though each was denser and more clay-like than the control chocolate (which is to be expected when manufacturing chocolate with non-traditional ingredients). The fact that acceptable organoleptic properties were achieved shows that CPH powders of the invention may be used to increase the dietary fibre content of chocolate, which may lead to improved health benefits attributed to high fibre intake.

This preliminary evaluation of CPH showed an opportunity for potential application as non-noble bulking in chocolate. It also demonstrated that the method of processing CPH affects organoleptic properties.

Example 5—Incorporating CPH Powder of Example 1 Milled to Various Particle Sizes into Milk Chocolate at 10 wt. %

CPH variants (Run #B19 of FIG. 1) and non-fat dry milk, NFDM (comparative example) were incorporated as bulking agents into Milk chocolate masses. A commercially available milk chocolate product was used as a representative milk chocolate mass for these experiments. As a typical procedure, 20 g of CPH powder of Example 1 was added to 180 g melted milk chocolate mass per the schematic described in FIG. 6A to yield the experimental chocolate bars (5i, 5ii, 5iii, 5iv and 5v) shown in FIG. 6B. No fat adjustment was made to prepare the chocolates.

Figure 6A:
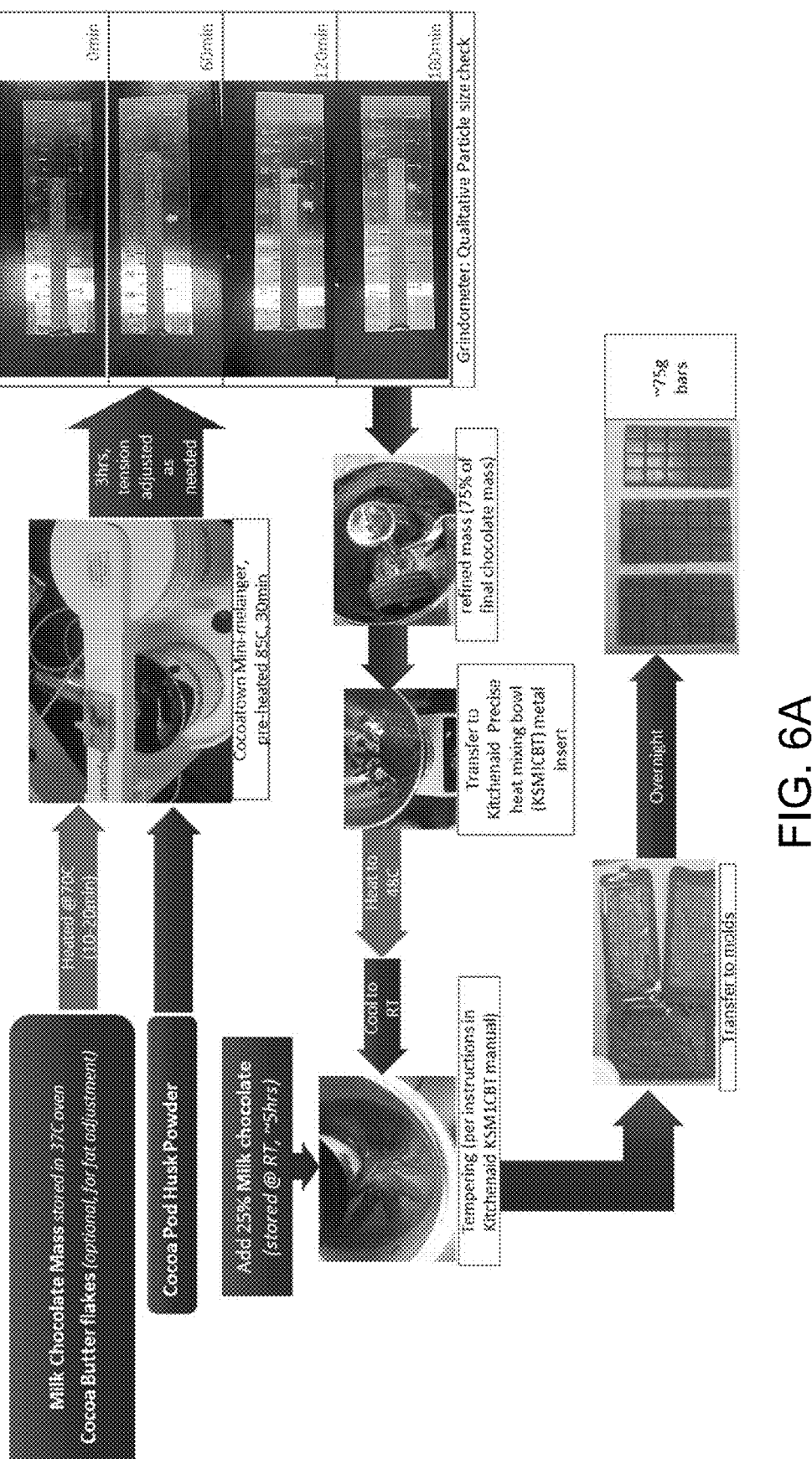
FIG. 6A is a schematic describing the benchtop process for incorporating CPH into Milk Chocolate masses at <200 g scale. The process is employed in preparing the chocolates described in Examples 5 and 6.
Figure 6B:
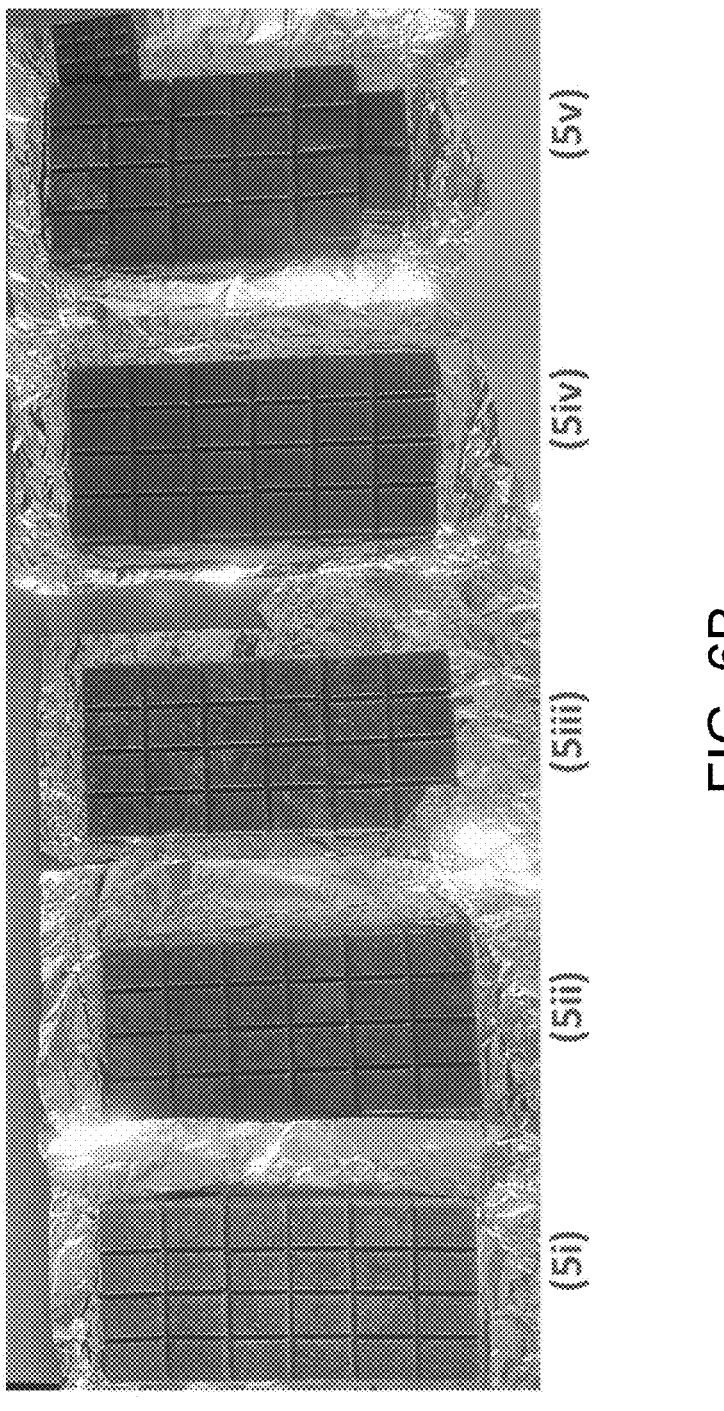
FIG. 6B is a photograph comparing the experimental chocolate bars described in Example 5 containing: (5i) 10% NFDM (comparative example), (5ii) 10% CPH (from Run #B19 sieved >230 mesh), (5Iii) (from Run #B19 sieved <230 mesh), (5iv) 10% CPH (from Run #B19 sieved <325 mesh) and (5v) 10% CPH (from Run #B18 sieved <325 mesh)

FIG. 6B illustrates the effect of incorporating 10 wt. % heat treated CPH (from Samples #B18, B19) of different particle sizes into milk chocolate masses in contrast to incorporating 10 wt. % NFDM as a comparative example. FIG. 6B shows that in contrast to NFDM (5i), coarse CPH powder of over 230 mesh size (5ii) yielded a richer, darker color. Fine CPH powder of <325 mesh size (5iv) yielded a rich, brown color with greater shine (gloss) and lower appearance of undesirable fat bloom. Among CPH powders <325 mesh, comparing vacuum oven dried CPH (5iv) with oven dried CPH (5v) revealed that the oven dried CPH provided an even darker brown color, almost resembling the appearance of artisan dark chocolates which are of increased commercial value.

Example 6—Incorporating CPH Powder of Example 1 into Milk Chocolate at 15 wt. %

Figure 7:
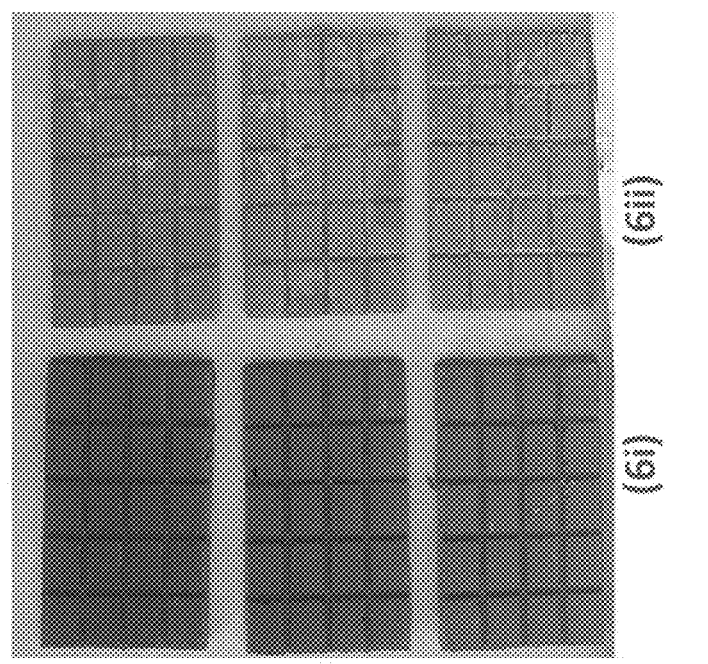
FIG. 7 is a photograph comparing the experimental chocolate bars described in Example 6 containing: (6i) 15% CPH (from Run #B19 sieved <230 mesh) and (6ii) 10% lactose (comparative example).

CPH variants (Run #B19) and Lactose (comparative example) were incorporated as bulking agents into milk chocolate masses, with fat adjustment (0.25 g Cocoa Butter/g CPH) in accordance with the schematic described in FIG. 6A. As shown in FIG. 7, CPH of fine particle size (<325 mesh) was incorporated into a commercial milk chocolate product at 15 wt. % (6i). As a comparative example (6ii), lactose was incorporated into at 10 wt. % (lactose is the primary constituent of whey powder, a bulk filler typically used in milk chocolate). Despite the increased use level, the CPH formed a smoother chocolate bar, with a rich brown color (6i), while the comparative example showed inhomogeneity in the form of fat pooling on the surface (6ii). Informal round table tasting results suggested that 6i had firmer bite, gritty mouthfeel, reduced sweetness, darker color and grassy off-note relative to 6ii.

Example 7—Proposed Process to Produce CPH Ingredient at Commercial Scale

Any process for producing CPH ingredient at commercial scale must, within a short time frame, convert fresh cocoa pod husks generated from pod opening into a stable intermediate (or final product) that is not at risk of microbial spoilage, otherwise, the risk of microbial spoilage, which results in toxic contaminants (mycotoxins, etc.) rises. To overcome the supply chain challenge posed by this time constraint after pod opening, the process of converting fresh husks into CPH is preferably initiated in close proximity to the source of the husks, i.e., the cocoa fermentry (or farm, etc.). To obviate the logistical challenges posed by locating advanced industrial processing equipment and skilled operators in proximity to cocoa farms, the equipment used should be preferably "low-tech", requiring minimal capital investment and operator expertise. Preferably such equipment is locally available at low cost in the cocoa growing regions of the world.

A farm-worker opening cocoa pods to obtain the beans can generate ~130 kg fresh cocoa pod husks/hour. The husks can then be washed in a commercial fruit/vegetable washer to remove external dirt, debris, pesticide, etc.

Next, the washed husks can be subjected to blanching in steam/hot water/dilute acid (in a commercial fruit and vegetable steam blanching/cooking machine) to sterilize the material, as well as expel heavy metals, pesticides and mycotoxins. This step also helps soften the husks. The blanched husks can then be passed through a press to expel water. While different types of presses, such as screw press, expeller, etc, can be used, a low-tech, locally available solution such as a commercial sugarcane crusher is most preferable. The goal of this step is primarily to expel water and bring the material to ~50% or higher solids content. Additionally, this step may help remove any residual contaminants, as well as sugars, soluble fibers, etc, therefore increasing the total insoluble fibre (IDF) content of the final product.

The next step involves drying the material to a water activity (aw) of at least 0.65, which is recognized as a threshold critical to achieving microbial stability. Impingement ovens, such as commercial grade pizza ovens shown in FIG. 8, or low cost commercial drum dryers, or other locally available dryers and food dehydrators can be used to achieve this (note that polyaromatic hydrocarbons, i.e., PAH and acrylamide generated from the drying step must be closely monitored to ensure food safety and compliance with local regulations). The resultant dry CPH intermediate, with aw<0.65 (preferably aw<0.6, most preferably aw<0.55) is now expected to be stable to shipping and storage. The drying step may also enhance the brittleness of the CPH intermediate, which is beneficial to the grinding step that follows.

Being microbially stable, dry CPH intermediate can be stored and shipped as required to an offsite grinding/milling facility to grind to required particle size. It must be noted, that the ability (with relatively low investment and simple equipment) to convert fresh cocoa pod husks into a stable intermediate which can be stored and shipped overcomes critical problems of microbial spoilage and seasonality, which present significant logistical challenges for supply chain considerations (which is one reason why cocoa pod husks remain under-utilized as a waste stream).

In some cases, the CPH intermediate received after storage and shipping may undergo further drying to bring aw<0.2 and reduce the total moisture content.

While commercially available hammer mills, jet mills, cell mills and knife mills can be used to achieve size reduction, planetary ball mills with ceramic grinding media and air classifier mills are expected to be particularly efficient in achieving the fine particle size (d90<30 micron, preferably <20 micron) required for chocolate.

In this way, a CPH ingredient that is most preferred for chocolate application can be commercially produced with relatively low capital investment and without significant supply chain and logistical constraints.

The above embodiment is/embodiments are described by way of example only. Many variations are possible without departing from the scope of the invention as defined in the appended claims.

The invention claimed is:

1. Cocoa pod husk powder having an amount of insoluble dietary fibre of at least 55 wt. % of the total weight of the cocoa pod husk powder and/or having an amount of total dietary fibre of at least 68 wt. % of the total weight of the cocoa pod husk powder, and wherein the total ash content of the powder is no more than 6.0 wt. %.

2. Cocoa pod husk powder as claimed in claim 1 comprising total sugars of no more than 8 wt. %.

3. Cocoa pod husk powder as claimed in claim 1 having an ash content of no more than 5.0 wt. %.

4. Cocoa pod husk powder as claimed in claim 1, manufactured by a method comprising the steps of: reducing cocoa pod husk in a wet-milling process to a paste; and drying the paste at a temperature of at least 80° C.

5. Cocoa pod husk powder as claimed in claim 1, having an amount of insoluble dietary fibre of at least 60 wt. % of the total weight of the cocoa pod husk powder and/or an amount of total dietary fibre of at least 70 wt. % of the total weight of the cocoa pod husk powder.

6. Cocoa pod husk powder as claimed in claim 1, wherein the powder comprises moisture in an amount of no more than 12.5 wt. % of the total weight of the powder.

7. Cocoa pod husk powder as claimed in claim 1, wherein the water activity of the cocoa pod husk powder is no more than Aw 0.4.

8. Cocoa pod husk powder as claimed in claim 1 comprising fat in an amount of less than 2 wt. % and protein in an amount of less than 10 wt. %, of the total weight of the cocoa pod husk powder.

9. Cocoa pod husk powder as claimed in claim 1, wherein the cocoa pod husk powder comprises cocoa pod husk flesh and/or cocoa pod husk skin.

10. Cocoa pod husk powder as claimed in claim 9, wherein the cocoa pod husk powder comprises whole cocoa pod husk.

11. Cocoa pod husk powder as claimed in claim 1, having an average particle size of between 2 and 750 microns.

12. A comestible product comprising cocoa pod husk powder as claimed in claim 1.

13. A comestible product as claimed in claim 12 comprising a product selected from confectionery, a baked product, a filling, a spread and a beverage.

14. Cocoa pod husk powder as claimed in claim 1 wherein the powder is a gelling, thickening or bulking agent.

15. Cocoa pod husk powder as claimed in claim 14, wherein the powder is in a comestible product.

16. Cocoa pod husk powder as claimed in claim 1 wherein the powder is an egg solids replacer in a comestible product.

17. A method of manufacturing a comestible product, comprising homogeneously mixing cocoa pod husk powder of claim 1 with one or more comestible product ingredients and forming the comestible product.

18. Cocoa pod husk powder as claimed in claim 1, having an average particle size of between 20 and 250 microns.

* * * * *